United States Patent [19]

Stein

[11] Patent Number: 4,708,493

[45] Date of Patent: Nov. 24, 1987

[54] APPARATUS FOR REMOTE MEASUREMENT OF TEMPERATURES

[75] Inventor: Alexander Stein, Secaucus, N.J.

[73] Assignee: Quantum Logic Corporation, Secaucus, N.J.

[21] Appl. No.: 864,276

[22] Filed: May 19, 1986

[51] Int. Cl.$^4$ ............................................. G01J 5/30
[52] U.S. Cl. ................................... 374/128; 374/126; 356/45; 250/341
[58] Field of Search ............... 374/120, 126, 129, 128, 374/9; 356/43, 45; 250/338, 341

[56] References Cited

U.S. PATENT DOCUMENTS

| | | | |
|---|---|---|---|
| 2,611,541 | 9/1952 | Gray | 374/126 |
| 2,737,809 | 3/1956 | Fastie | 374/126 |
| 3,422,678 | 1/1969 | Murray | 374/126 |
| 3,492,869 | 2/1970 | Toyota et al. | 374/126 |
| 3,795,918 | 3/1974 | Sunderland | 374/126 |
| 3,796,099 | 3/1974 | Shimotsuma et al. | 374/126 |
| 4,417,822 | 11/1983 | Stein et al. | 374/126 |
| 4,465,382 | 8/1984 | Iuchi et al. | 374/126 |
| 4,647,774 | 3/1987 | Brisk et al. | 374/128 |
| 4,647,775 | 3/1987 | Stein | 250/338 |
| 4,659,234 | 4/1987 | Brouwer et al. | 374/126 |

Primary Examiner—Charles Frankfort
Assistant Examiner—Thomas B. Will

[57] ABSTRACT

The temperature of a thermally emitting target which radiates over a band of wavelengths which includes first and second spaced wavelengths and which has an unknown emissivity characteristic at which the emissivity at one wavelength may but does not necessarily differ from the emissivity of another wavelength is read remotely by [a] deriving signals from those portions of the thermal radiation at these two wavelengths; [b] deriving signals from the reflected portions of two beams of radiation at these wavelengths which strike the target; and [c] by using these derived signals to compute the temperature.

11 Claims, 4 Drawing Figures

APPARATUS FOR REMOTE MEASUREMENT OF TEMPERATURES

BACKGROUND OF THE INVENTION

Pyrometers used for remote measurement of temperature of a hot target by measuring the radiance emitted by the target are known to the art. However, such measurements cannot be made accurately without prior knowledge of the emissivity of target. Since the emissivity of any material not only depends upon the material composition and surface texture, but also may vary with the wavelength used by the pyrometer in making the measurement, as well as the viewing angle employed and even the temperature of the target, the emissivity is seldom if ever known with sufficient accuracy so that the measurement of temperature is error free.

The present invention is directed toward a new type of pyrometer wherein prior knowledge of the target emissivity is not needed or utilized and wherein the emissivity uncertainty is eliminated by direct and in situ measurement of the ratio of reflectivites of the target at two different wavelengths of measurement.

SUMMARY OF THE INVENTION

All physical bodies at temperatures above absolute zero emit elctromagnetic radiation over a wide range of wavelengths in accordance with the Planck formula:

$$L = E2c^2hW^{-5} \left[ \exp\left(\frac{hc}{\omega kT}\right)^{-1} \right]^{-1} \quad (1)$$

where L is the spectral radiance at a selected wavelength W; T is the temperature of the body; E is the emissivity at wavelength W; c is the velocity of light in vacuum; h is Planck's constant; and k is Boltzmann's constant. If the target were to be a black body, which by definition has an emissivity equal to one, the Planck formula becomes $$L = 2c^2hW^{-5} \left[ \exp\left(\frac{hc}{\omega kT}\right)^{-1} \right]^{-1} \quad (2)$$

For two spaced apart wavelengths A and B, the corresponding black body radiances P and Q at these wavelengths are defined as:

$$P = 2c^2hA^{-5} \left[ \exp\left(\frac{hc}{AkT}\right)^{-1} \right]^{-1} \quad (3)$$

$$Q = 2c^2hB^{-5} \left[ \exp\left(\frac{hc}{BkT}\right)^{-1} \right]^{-1} \quad (4)$$

When the target thermally radiates over a band of wavelengths which includes wavelengths A and B, and the actual emissivities at these wavelengths are represented as M and N respectively, the actual measured thermal radiances at these wavelengths, represented as F and G respectively are defined as follows:

$$F = M2c^2hA^{-5} \left[ \exp\left(\frac{hc}{AkT}\right)^{-1} \right]^{-1} \quad (5)$$

$$G = N2c^2hB^{-5} \left[ \exp\left(\frac{hc}{BkT}\right)^{-1} \right]^{-1} \quad (6)$$

The emissivities M and N are then defined as follows:

$$M = F/P \quad (7)$$

$$N = G/Q \quad (8)$$

When a target is subjected to a beam of incident radiation of specified wavelength and a portion of this incident radiation is reflected to the point at which the beam originated, the relationship between the target emissity E and the relative reflected radiation r (bidirectional reflectivity) is defined with the help of Kirchhoff's law as:

$$r = H(1-E) \quad (9)$$

where H is the ratio of the bi-directional reflectivity to the hemispherical reflectivity. The value of H is substantially the same for each of the wavelengths A and B. Hence, the ratio R of the relative reflected radiation at wavelength A with emissivity of M to the relative reflected radiation at wavelength B with emissivity of N is then equal to:

$$R = \frac{1-M}{1-N} \quad (10)$$

Since R, F and G can be measured and A and B are known, the four equations (5), (6), (7) and (8) contain only three unknowns T, M and N and these equations can be solved by various known numerical techniques as for example a method of successive approximations.

In accordance with the invention, the desired measurements are obtained and these measurements and known quantities are used to read remotely the temperature of a thermally radiating target which radiates over a band of wavelengths which includes first and second spaced wavelengths. The target has an unknown emissivity characteristic at which the emissivity at one wavelength may but does not necessarily differ from the emissivity at another wavelength.

In accordance with the invention, a first electrical signal is obtained which is responsive to that portion of the thermal radiation at the first wave length which impinges upon the apparatus, the first signal varying monotonically therewith. A second signal is obtained which is responsive to that portion of the thermal radiation at the second wavelength which impinges upon the apparatus, the second signal varying monotonically therewith. A first beam of radiation at the first wavelength is directed upon the target whereby a portion of the first beam is reflected from the target. A second beam of radiation at the second wavelength is directed upon the target whereby a portion of the second beam is reflected from the target. A third signal is obtained from the impinging portion of the first reflected beam and varies monotonically therewith. A fourth signal is obtained from the impinging portion of the second reflected beam and varies monotonically therewith. The temperature is then computed by using the first, second, third and fourth signals:

DETAILED DESCRIPTION OF PREFERRED EMBODIMENT

Figure 1:
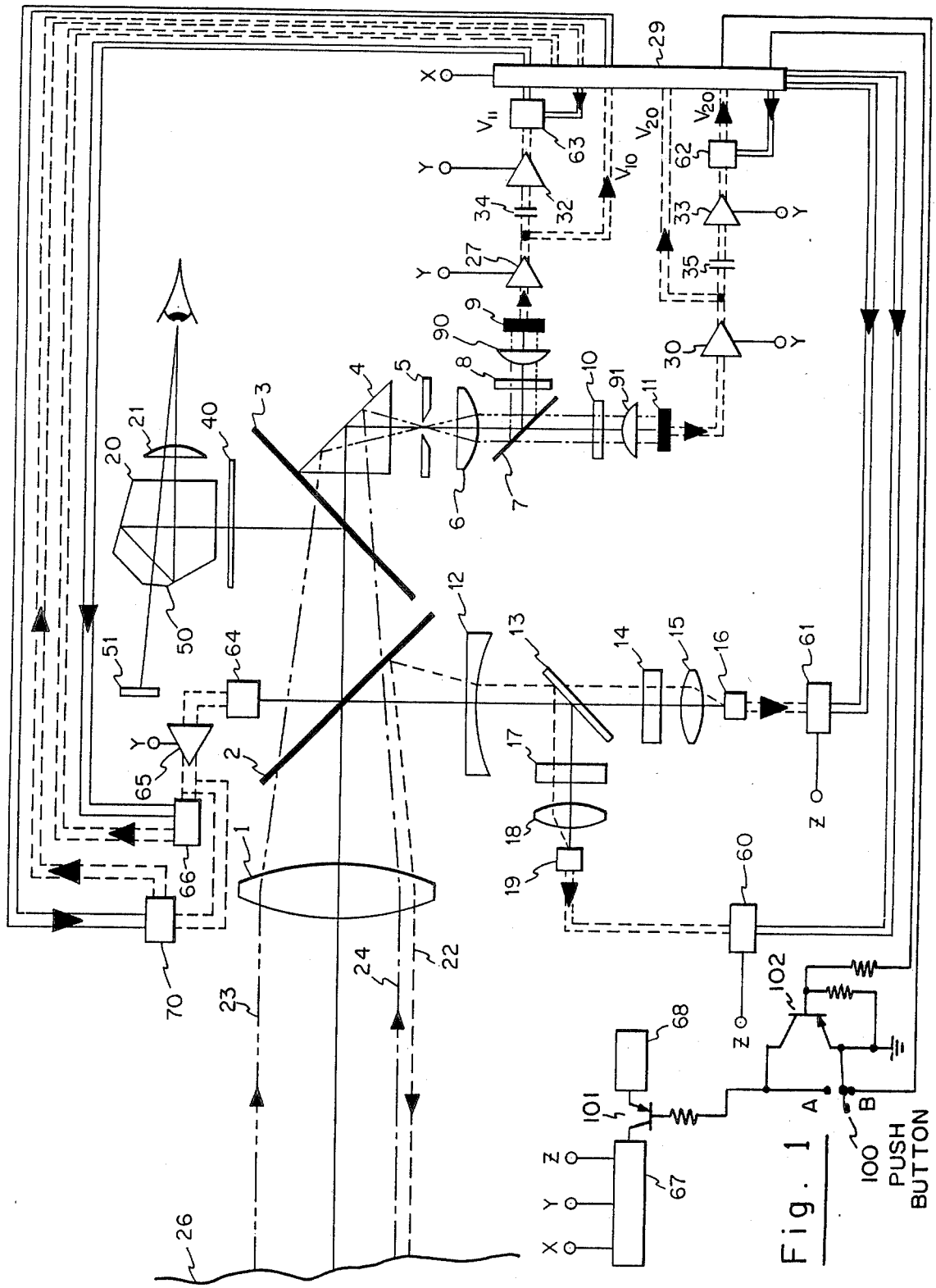
FIG. 1 is a simplified diagramatic view illustrating the optical and electrical systems employed in the invention.
Figure 2:
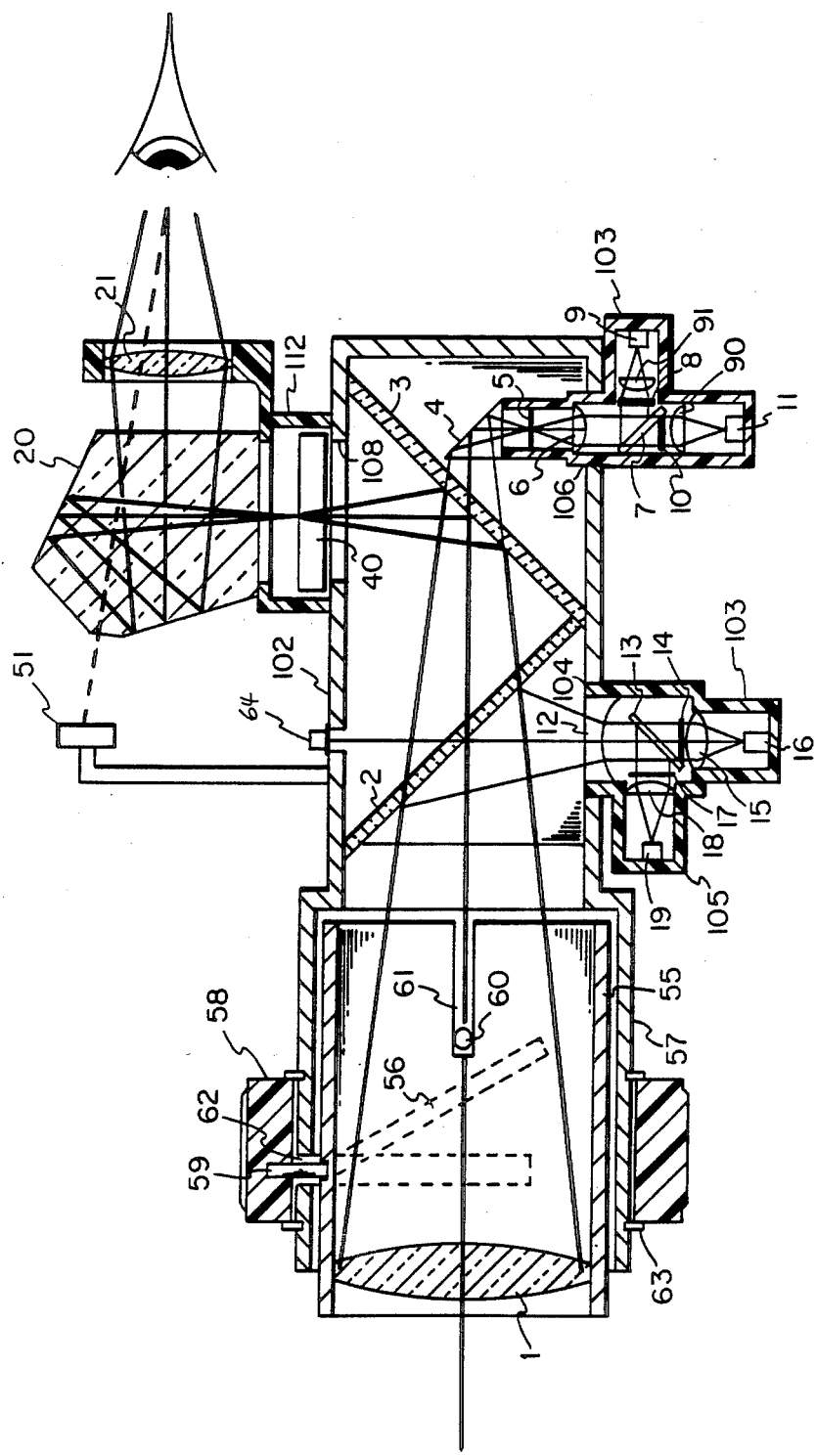
FIG. 2 is a side view in cross section of the housing and certain component parts employed in the invention.
Figures 3, 4:
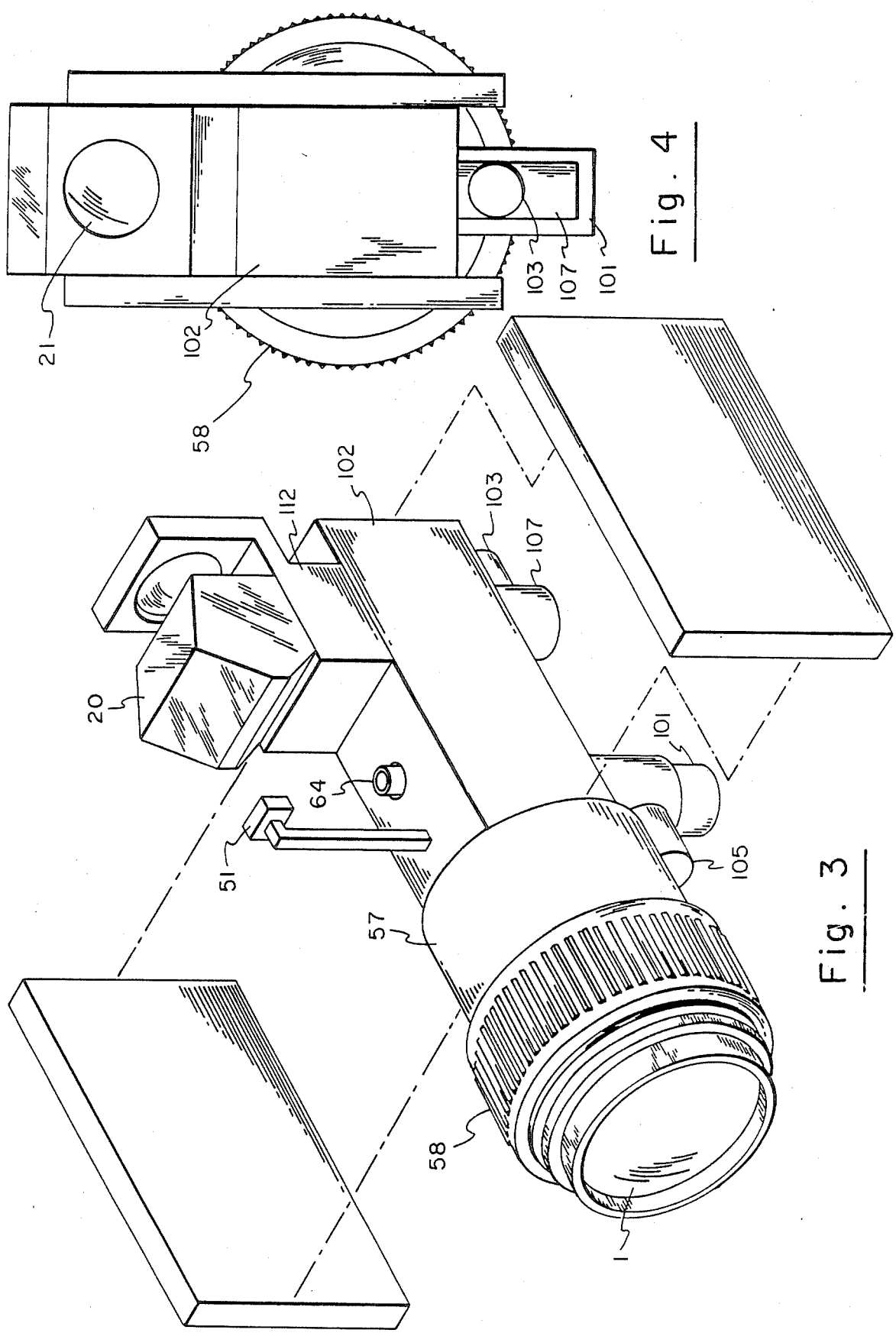
FIG. 3 is a perspective view of the structure shown in FIG. 2.
FIG. 4 is an end view of the structure shown in FIG. 3.

Referring now to FIGS. 1-4, a first front relatively short hollow circular cylinder 57 having a first diameter is axially aligned with and connected end to end with a second rear longer hollow cylinder 102 having a rectangular shape in cross section. These cylinders constitute the major instrument housing.

The second cylinder 102 has a small forwardly disposed circular aperture 104 in one wall and another small rearwardly disposed circular aperture 106 in the same wall. Cylinder 102 also has a large rectangular aperture 108 disposed in an opposite wall.

Lens barrel 101 connected to aperture 104 has an axis perpendicular to the axis of cylinder 102 and has a diode laser 16 [emission at wavelength A] disposed therein. Also disposed in barrel 101 are lens 15, filter 14 [having a narrow band pass centered on wavelength A] and beam combiner 13. A side barrel extension 105 in barrel 101 contains a diode laser 19 [emission at wavelength B]. Disposed adjacent laser 19 is lens 18 and filter 17 [having a narrow band pass centered on wavelength B].

Lens barrel 107 connected to aperture 106 has an axis perpendicular to the axis of cylinder 102. Prism 4 disposed on top of barrel 107 is used to fold the optical path to reduce the overall length of the instrument. Aperture plate 5 disposed below the prism has a pin hole located at the focal plane of lens 1 which is disposed in the front end of the front cylinder. The pin hole passes radiation from a geometrically corresponding area in the target place. Lens 6 is disposed below plate 5. Beamsplitter 7 is disposed below lens 6. Filter 10 [having a narrow band pass centered on wavelength B ] is disposed below the beamsplitter 7 and above lens 90 and photodetector 11. A side extension barrel 103 of barrel 107 contains filter 8 [having a band pass centered on wavelength A], lens 91 and photodetector 9.

The inner walls of the entire structure are rendered black to suppress stray radiation.

Dichroic beam combiners and splitters 2 and 3 are disposed essentially at right angles to each other in cylinder 102 and at forty five degrees and one hundred and thirty five degrees respectively with respect to the longitudinal axis of cylinder 102.

A fixture 112 is secured to cylinder 102 overlying aperture 108 and has a ground glass viewing screen 40 parallel to the aperture. The fixture has a right angled section accommodating eye piece 21 and offset from the rest of the fixture upon which prism 20 rests.

Lens is firmly mounted in lens barrel 55 which has a helical groove 56 on its outside surface. Barrel 55 is disposed with its axis aligned with the axis of cylinder 57. Cylinder 57 has a pin 60 which engages a slot 61 in the barrel 55. A rotatable element, focusing ring 58, is held in place on the outside of cylinder 57 by retaining rings 63 and has a pin 59 which reaches through slot 62 in cylinder 57 into the groove 56. Manual rotation of ring 58 causes the barrel 55 to move forward or backward along the common axis [with cylinder 57] with respect to cylinder 57 which stays fixed. The ring is rotated to bring the visual image into focus. The visual image is formed by lens 1 onto ground glass viewing screen 40 with the assistance of cold mirror 3 which separates the visible from the infrared radiation. The visual image formed on screen 40 is viewed via eye lens 21 through the image-uprighting prism 20. A flat facet 50 is polished into this prism to allow direct viewing of an alpha-numeric display 51 within the observation field of view.

The use of the beam combiners and splitters 2 and 3 superimposes the optical axes of the transmission system of the lasers, the receiving system of the photodetectors and the viewing system, with lens 1 serving as the objective lens for all three systems.

Target 26 radiates thermally over a band of wavelengths A and B. A portion of this radiation, represented by rays 23, strikes the objective lens 1 of the temperature measuring apparatus which is disposed remotely from the target. Lens 1 directs the rays through beam combiner 2 and beam splitter 3 onto prism 4. The prism bends the beam at right angles and focusses same onto plate 5 which has a pinhole aperture 42. The beam passing through the aperture is collimated by lens 6 and then strikes dichroic beam splitter 7. The splitter is designed to divide the beam into two spectral bands, one of which contains wavelength A, the other of which contains wavelength B. The splitter reflects one of these bands and transmits the other of these bands.

The first band is reflected and passes through filter 8 which passes only a narrow spectral component centered about wavelength A. This component impinges upon photodetector 9. Photodetector 9 then produces a first direct photocurrent which, after amplification in amplifier 27, becomes a first electrical voltage or signal $V_{01}$ which varies monotonically with the appropriate portion of the thermal radiation of the target of wavelength A. This first signal is supplied as an input to microcomputer 29.

The second band is transmitted and passes through filter 10 which passes only a narrow spectral component centered about wavelength B. This component impinges upon photodetector 11. Photodetector 11 then produces a second direct photocurrent which, after amplification in amplifier 30, becomes a second electrical voltage or signal $V_{02}$ which varies monotonically with the appropriate portion of the thermal radiation of the target at wavelength B. This second signal is supplied as an input to microcomputer 29.

The two signals $V_{01}$ and $V_{02}$ thus supply the requisite information concerning the spectral radiance components of the hot target to the microcomputer. Lenses 90 and 91 are optional; they concentrate the radiation components onto the sensitive areas of the respective detectors.

The requisite information concerning the emissivity components is obtained by directing two laser beams produced by laser diode 16 [wavelength A] and laser diode 19 [wavelength B] respectively onto the same spot on the target. Radiation from these lasers is collimated by lenses 15 and 18 respectively, then passed through filters 14 and 17 respectively [these filters block infrared light which would otherwise unduly heat up the lasers]. The radiation is then combined in beam combiner 13. The combined radiation then passes through a negative lens 12 onto beam splitter 2. A major portion of the radiation 20 then passes outward through lens 1 onto the target.

The reflected radiation 24 from the target passes backward through lens 1 and is detected separately for each wavelength. In order for the instrument to distinguish between the radiation emitted by the target and that resulting from reflected laser radiation, the two laser beams are intensity modulated. More particularly, the lasers are not operated continuously, but are pulsed on and off. In addition, to avoid undesirable interaction and to simplify detection in the normalization step [this step is described below], the lasers are pulsed on and off with such timing that their output pulses are interleaved and thus are spaced in time with respect to each other. The reflected radiation causes modulated photocurrents to be generated in detectors 9 and 11. The detectors thus yield modulated and unmodulated components which are separated by using capacitors 34 and 35 which block the unmodulated components and pass the modulated components to corresponding pulse amplifiers 32 [wavelength A] and 33 [wavelength B]. The signals produced at the outputs of these amplifiers are passed to sample and hold amplifiers 63 and 62 respectly. These amplifiers only conduct when suitable timing signals from the microcomputer are supplied thereto. Between timing signals, these amplifiers hold the last sampled value. The outputs of these amplifiers are supplied as third and fourth input signals $V_{11}$ and $V_{12}$ to the microcomputer 29.

Normalization is necessary since the laser power will vary because of variations in ambient temperature, changes in battery power and the like. In order to prevent such variations from adversely affecting the performance of the instrument, it is necessary to insure that appropriate corrections are fed to the microcomputer. To this end, a small portion of the radiation emitted by the lasers passes through combiner 2 and impinges upon photodetector 64. The output of this photodiode is fed through amplifier 65 to the input of sample and hold amplifiers 70 and 66. Since the laser outputs are interleaved, appropriate timing signals from the microcomputer insure that amplifier 66 [wavelength A] and amplifier 70 [wavelength B] produce interleaved output voltages $V_{21}$ and $V_{22}$ which are supplied to the microcomputer whereby the desired normalization ensues.

The firmware program, which contains the appropriate algorithms and tables, is stored in the microcomputer.

Each of lasers 16 and 19 is connected to a corresponding one of pulsed laser supply units 60 and 61. Battery pack 68 supplies power via a logic controlled electronic switch to a circuitry unit 67. Unit 67 has voltage output leads X, Y and Z which are connected to the various amplifiers and microcomputer to distribute the necessary operating voltages as shown.

The electronic switch operates as follows. When contact A of push button switch 100 is open, transistors 101 and 102 are non-conducting, the instrument is inoperative and there is no current drain. At this point, contact B of the switch 100 is connected to ground. When the push button is engaged, contact B is opened and contact A is closed. This action switches transistor 101 into full conduction. Power is then supplied to unit 67 and initiates operation of the instrument. When the button is then dtsengaged, the microcomputer renders transistor 102 conductive which holds transistor 101 in conduction.

During an initial period of about 0.2 seconds, the instrument receives the thermal radiance of the target. Then a series of pulses from the microcomputer triggers the lasers into pulsed operation for about 0.2 seconds. After the appropriate calculations have been made and the temperature reading has been displayed by display 51, the microcomputer renders transistor 102 nonconductive, thus rendering transistor 101 conductive and making the instrument inoperative.

More detailed descriptions of the power supply operation, beam splitters and combiners, and amplifiers and other circuit elements can be found in copending application Ser. No. 707,742, filed Mar. 4, 1985 now U.S. Pat. No. 4,647,774 and assigned to the assignee of the present application. This application is incorporated by reference herein.

Wavelength A can have a value of 1.3 microns, while wavelength B can have a value of 1.5 microns. Laser diode commercially designated as FLD 130 D-4-WJ can be used as laser 16, while laser diode commercially designated as FLD 150 D 4 WJ can be used as laser 19. Under some conditions, it is not necessary to use laser diodes and light emitting diodes can be used instead. Using the same wavelengths, light emitting diode FED 130 KIWB cand be substituted for laser 16, while light emitting diode FED 150 KIWB can be substituted for laser 19. The photodetector commercially designated as FID 13S32WS 150 can be used in each of the photodetector applications disclosed herein.

The normalization operation as shown is carried out in the microcomputer. Alternatively, the normalization operation can be carried out by normalizing the third and fourth signals prior to supplying them to the microcomputer. The ratio of the reflected portion of the first reflected beam to that of the reflected portion of the second reflected beam is also obtained as shown in the microcomputer. Alternatively, this ratio can also be obtained from the normalized signals prior to supplying them to the microcomputer.

What is claimed is:

1. Apparatus for remotely reading the temperature of a thermally radiating target which radiates over a band of wavelengths which includes first and second spaced wavelengths, said target having an unknown emissivity characteristic at which the emissivity at one wavelength may but does not necessarily differ from the emissivity of another wavelength, said apparatus comprising:

first means responsive to that portion of the thermal radiation at said first wavelength which impinges on said first means to derive therefrom a first electrical signal which varies monotonically with the thermal radiation at said first wavelength;

second means responsive to that portion of the thermal radiation at said second wavelength which impinges on said second means to derive therefrom a second electrical signal which varies monotonically with the thermal radiation at said second wavelength;

third means to direct a first beam of radiation at said first wavelength upon said target whereby a portion of said first beam is reflected from said target;

fourth means to direct a second beam of radiation at said second wavelength upon said target whereby a portion of said second beam is reflected from said target;

fifth means responsive to that portion of the first reflected beam which impinges on said fifth means to derive therefrom a third electrical signal which varies monotonically therewith with the reflected portion of the first reflected beam;

sixth means responsive to that portion of the second reflected beam which impinges on said sixth means to derive therefrom a fourth electrical signal which varies monotonically with the reflected portion of the second reflected beam; and seventh means responsive to said first, second, third and fourth signals to compute the temperature of said target.

2. Apparatus of claim 1 further including eighth means for normalizing said third and fourth signals, said seventh means being responsive to said first and second signals and said normalized third and fourth signals.

3. Apparatus of claim 2 wherein the first and second signals are not modulated and said third and fourth signals are modulated.

4. Apparatus at set forth in claim 3 wherein each of said third and fourth means includes a separate laser.

5. Apparatus as set forth in claim 3 wherein each of the third and fourth means includes a separate light emitting diode.

6. Apparatus as set forth in claim 3 wherein each of the first and second means includes a separate photodetector.

7. Apparatus as set forth in claim 3 wherein said eighth means includes a photodetector.

8. A method for remotely reading the temperature of a thermally radiating target which radiates over a band of wavelengths which includes first and second spaced wavelengths, the target having an unknown emissivity characteristic at which the emissivity of one wavelength may but does not necessarily differ from the emissivity of another wavelength, the method comprising the steps of:

deriving, from that portion of the thermal radiation at the first wavelength which radiates from the target, a first electrical signal which varies monotonically with the thermal radiation of the first wavelength;

deriving, from that portion of the thermal radiation at the second wavelength which radiates from the target, a second electrical signal which varies monotonically with the thermal radiation at the second wavelength;

directing upon the target a first beam of radiation at the first wavelength whereby a portion of the first beam is reflected from the target;

directing upon the target a second beam of radiation at the second wavelength whereby a portion of the second beam is reflected from the target;

deriving, from the reflected portions of both reflected beams, corresponding third and fourth signals, each of the third and fourth signals varying monotonically with the reflected portion of the corresponding reflected beam; and computing, with the use of the first, second, third and fourth signals, the temperature of the target.

9. The method of claim 8 wherein each directed beam is a laser beam.

10. The method of claim 8 wherein each directed beam is produced by a light emitting diode.

11. The method of claim 8 wherein the ratio of said third signal to said fourth signal is utilized and wherein said third and fourth signals are normalized.

* * * * *